(12) United States Patent
Fan et al.

(10) Patent No.: US 10,470,217 B2
(45) Date of Patent: Nov. 5, 2019

(54) METHOD FOR FACILITATING RANDOM ACCESS, NETWORK NODE AND TERMINAL DEVICE

(71) Applicant: Telefonaktiebolaget LM Ericsson (publ), Stockholm (SE)

(72) Inventors: Rui Fan, Beijing (CN); Pål Frenger, Linköping (SE); Martin Hessler, Linköping (SE); Erik Eriksson, Linköping (SE); Hai Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 170 days.

(21) Appl. No.: 15/115,799

(22) PCT Filed: Jul. 20, 2016

(86) PCT No.: PCT/CN2016/090674
§ 371 (c)(1),
(2) Date: Aug. 1, 2016

(87) PCT Pub. No.: WO2017/059720
PCT Pub. Date: Apr. 13, 2017

(65) Prior Publication Data
US 2018/0206270 A1 Jul. 19, 2018

(51) Int. Cl.
*H04W 74/08* (2009.01)
*H04W 48/12* (2009.01)
(Continued)

(52) U.S. Cl.
CPC ....... *H04W 74/0833* (2013.01); *H04W 48/12* (2013.01); *H04W 72/1273* (2013.01); *H04W 74/006* (2013.01)

(58) Field of Classification Search
CPC .......... H04W 74/0833; H04W 74/006; H04W 48/12; H04W 72/1273; H04L 5/0087; H04L 5/0091
See application file for complete search history.

(56) References Cited

U.S. PATENT DOCUMENTS

| 7,512,086 B2* | 3/2009 | Choi .................. H04W 52/50 370/328 |
| 9,648,641 B2* | 5/2017 | Sun ................. H04W 74/0833 |

(Continued)

FOREIGN PATENT DOCUMENTS

| CN | 103369611 A | 10/2013 |
| CN | 103796315 A | 5/2014 |

(Continued)

OTHER PUBLICATIONS

"Table" Merriam-Webster Dictionary, merriam-webster.com, archived May 26, 2016, accessed Sep. 20, 2018, 9 pages. (Year: 2016).*

(Continued)

*Primary Examiner* — Khaled M Kassim
*Assistant Examiner* — Thomas R Cairns
(74) *Attorney, Agent, or Firm* — Nicholson De Vos Webster & Elliott LLP

(57) ABSTRACT

Methods for facilitating random access between a network node and a terminal device are disclosed. One method includes transmitting to a terminal device access configuration information required for the terminal device to receive a first random access message from a network node. The method further includes transmitting the first random access message to the terminal device based on the access configuration information.

24 Claims, 4 Drawing Sheets

(51) Int. Cl.
*H04W 74/00* (2009.01)
*H04W 72/12* (2009.01)

(56) References Cited

U.S. PATENT DOCUMENTS

| | | | |
|---|---|---|---|
| 9,848,415 B2* | 12/2017 | Skov | H04W 72/042 |
| 2012/0077507 A1 | 3/2012 | Lee | |
| 2015/0163730 A1 | 6/2015 | Zhang | |
| 2018/0109971 A1* | 4/2018 | Takeda | H04L 1/18 |
| 2019/0013916 A1* | 1/2019 | Jin | H04L 5/0051 |

FOREIGN PATENT DOCUMENTS

| | | |
|---|---|---|
| EP | 3018921 A1 | 5/2016 |
| WO | 2014196908 A1 | 12/2014 |
| WO | 2015018044 A1 | 2/2015 |
| WO | 2015035597 A1 | 3/2015 |
| WO | 2015053553 A1 | 4/2015 |

OTHER PUBLICATIONS

Extended European Search Report for Application No. 16847579.6, dated Jan. 18, 2018, 6 pages.
International Search Report and the Written Opinion for Application No. PCT/CN2016/090674, dated Apr. 1, 2017, 11 pages.
3GPP TS 36321 V13.2.0 (Jun. 2016); 3rd Generation Partnership Project; Technical Specification Group Radio Access Network; Evolved Universal Terrestrial Radio Access (E-UTRA); Medium Access Control (MAC) protocol specification (Release 13), Jul. 7, 2016, 91 pages.
International Preliminary Report on Patentability for Application No. PCT/CN2016/090674, dated Nov. 6, 2018, 9 pages.
Communication pursuant to Article 94(3) EPC for Application No. 16847579.6, dated Dec. 4, 2018, 6 pages.

* cited by examiner

METHOD FOR FACILITATING RANDOM ACCESS, NETWORK NODE AND TERMINAL DEVICE

CROSS-REFERENCE TO RELATED APPLICATIONS

This application is a National stage of International Application No. PCT/CN2016/090674, filed Jul. 20, 2016, which is hereby incorporated by reference.

TECHNICAL FIELD

The present disclosure relates to radio communications, and more particularly, to methods for facilitating random access, a network node and a terminal device.

BACKGROUND

In Long Term Evolution (LTE) systems, a random access procedure is used to achieve uplink synchronization for a terminal device, also known as User equipment (UE), which either has not yet acquired, or has lost, its uplink synchronization. There are two types of random access procedures, contention-based and contention-free.

FIG. 1 shows a signaling sequence of a contention-based random access procedure. As shown, the contention-based random access procedure involves four messages, referred to as MSG1, MSG2, MSG3 and MSG4, respectively. MSG1 and MSG3 are uplink messages from a UE to a network node (e.g., an evolved NodeB (eNB)) and MSG2 and MSG4 are downlink messages from the network node to the UE. The contention-free random access procedure involves only two messages, MSG1 and MSG2.

Both MSG2 and MSG4 are carried in Physical Downlink Shared Channel (PDSCH) and scheduled via Physical Downlink Control Channel (PDCCH). The scheduling information for MSG2 is transmitted in a common search space and the scheduling information for MSG4 is transmitted in a UE-specific search space. Since the PDCCH needs to be decoded based on Cell Reference Signal (CRS), the random access procedure in LTE depends on the CRS.

The next generation networks are expected to be highly energy efficient. One of the design principles for the next generation networks is to minimize static, always-on signals in order to reduce energy consumption at the network side and to reduce interference to UEs served by neighboring eNBs. As a result, the CRS may not exist in the future. Hence, it will perhaps not be possible for the UE to receive MSG2 and/or MSG4 based on the CRS any more.

There is thus a need for a solution for random access to enable the UE to receive MSG2 and/or MSG4 when no CRS is available.

SUMMARY

It is an object of the present disclosure to provide methods for facilitating random access, a network node and a terminal device, capable of enabling a terminal device to receive a downlink message in a random access procedure when no CRS is available.

In a first aspect, a method in a network node is provided. The method includes: transmitting to a terminal device access configuration information required for the terminal device to receive a first random access message from the network node; and transmitting the first random access message to the terminal device based on the access configuration information.

In an embodiment, the access configuration information indicates configurations for Resource Elements (REs), Demodulation Reference Signal (DMRS), payload size, Modulation and Coding Scheme (MCS) and receiving timing associated with the first random access message.

In an embodiment, for each of the REs, DMRS, payload size, MCS and receiving timing, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the access configuration information further indicates a configuration for a scrambling sequence associated with the first random access message.

In an embodiment, for the scrambling sequence, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the access configuration information is included in a Common Access Information Table (C-AIT).

In an embodiment, the method further includes: transmitting to the terminal device an update to at least a part of the access configuration information. The update is included in a Dedicated Access Information Table (D-AIT).

In an embodiment, the method further includes: transmitting to the terminal device further access configuration information required for the terminal device to receive a third random access message from the network node; and transmitting the third random access message to the terminal device.

In an embodiment, the further access configuration information indicates configurations for REs, DMRS, payload size and MCS associated with a control channel for scheduling the third random access message.

In an embodiment, the further access configuration information is included in a Common Access Information Table (C-AIT) or in the first random access message.

In an embodiment, the method further includes: transmitting to the terminal device an update to at least a part of the further access configuration information. The update is included in a Dedicated Access Information Table (D-AIT).

In a second aspect, a network node is provided. The network node includes: a transmitting unit configured to: transmit to a terminal device access configuration information required for the terminal device to receive a first random access message from the network node; and transmit the first random access message to the terminal device based on the access configuration information.

In a third aspect, a network node is provided. The network node includes a transceiver, a processor and a memory. The memory contains instructions executable by the processor whereby the network node is operative to: transmit to a terminal device access configuration information required for the terminal device to receive a first random access message from the network node; and transmit the first random access message to the terminal device based on the access configuration information.

In a fourth aspect, a computer program is provided. The computer program includes computer readable instructions which, when run on a network node, cause the network node to perform the method according to the first aspect.

In a fifth aspect, a computer program storage product is provided. The computer program storage product includes computer readable storage means storing the computer program according to the fourth aspect.

The above embodiments of the first aspect are also applicable for the second, third, fourth and fifth aspects.

In a sixth aspect, a method in a terminal device is provided. The method includes: receiving from a network node access configuration information required for the terminal device to receive a first random access message from the network node; and receiving the first random access message from the network node based on the access configuration information.

In an embodiment, the access configuration information indicates configurations for Resource Elements (REs), Demodulation Reference Signal (DMRS), payload size, Modulation and Coding Scheme (MCS) and receiving timing associated with the first random access message.

In an embodiment, for each of the REs, DMRS, payload size, MCS and receiving timing, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the step of receiving the first random access message from the network node based on the access configuration information includes: determining the configuration for each of the REs, DMRS, payload size, MCS and receiving timing based on: the single configuration, or the set of candidate configurations and the rule of mapping; and receiving the first random access message based on the determined configuration for each of the REs, DMRS, payload size, MCS and receiving timing.

In an embodiment, the access configuration information further indicates a configuration for a scrambling sequence associated with the first random access message.

In an embodiment, for the scrambling sequence, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the step of receiving the first random access message from the network node based on the access configuration information includes: determining the configuration for the scrambling sequence based on: the single configuration, or the set of candidate configurations and the rule of mapping; and receiving the first random access message based on the determined configuration for the scrambling sequence.

In an embodiment, the access configuration information is included in a Common Access Information Table (C-AIT).

In an embodiment, the method further includes: receiving from the network node an update to at least a part of the access configuration information. The update is included in a Dedicated Access Information Table (D-AIT).

In an embodiment, the method further includes: receiving from the network node further access configuration information required for the terminal device to receive a third random access message from the network node; and receiving the third random access message from the network node based on the further access configuration information.

In an embodiment, the further access configuration information indicates configurations for REs, DMRS, payload size and MCS associated with a control channel for scheduling the third random access message.

In an embodiment, the further access configuration information is included in a Common Access Information Table (C-AIT) or in the first random access message.

In an embodiment, the method further includes: receiving from the network node an update to at least a part of the further access configuration information. The update is included in a Dedicated Access Information Table (D-AIT).

In a seventh aspect, a terminal device is provided. The terminal device includes: a receiving unit configured to: receive from a network node access configuration information required for the terminal device to receive a first random access message from the network node; and receive the first random access message from the network node based on the access configuration information.

In an eighth aspect, a terminal device is provided. The terminal device includes a transceiver, a processor and a memory. The memory contains instructions executable by the processor whereby the terminal device is operative to: receive from a network node access configuration information required for the terminal device to receive a first random access message from the network node; and receive the first random access message from the network node based on the access configuration information.

In a ninth aspect, a computer program is provided. The computer program includes computer readable instructions which, when run on a terminal device, cause the terminal device to perform the method according to the sixth aspect.

In a tenth aspect, a computer program storage product is provided. The computer program storage product includes computer readable storage means storing the computer program according to the tenth.

The above embodiments of the sixth aspect are also applicable for the seventh, eighth, ninth and tenth aspects.

With the embodiments of the present disclosure, a terminal device receives from a network node access configuration information required for receiving a random access message (e.g., MSG2) and then receives the random access message from the network node based on the access configuration information. In this way, even if no CRS is available, the terminal device can receive the downlink message in the random access procedure.

BRIEF DESCRIPTION OF THE DRAWINGS

The above and other objects, features and advantages will be more apparent from the following description of embodiments with reference to the figures, in which.

DETAILED DESCRIPTION

Figure 1:
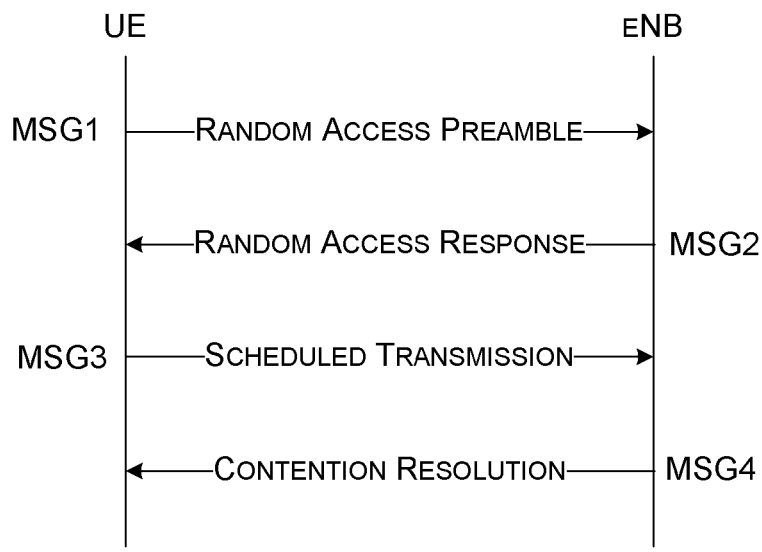
FIG. 1 is a schematic diagram showing a signaling sequence of a contention-based random access procedure.

The embodiments of the disclosure will be detailed below with reference to the drawings. It should be noted that the following embodiments are illustrative only, rather than limiting the scope of the disclosure.

The term "network node" refers to a device in a wireless communication network via which a terminal device accesses the network and receives services therefrom. The network node refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, a pedestrian and the like.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based in part or more on." The term "one embodiment" and "an embodiment" are to be read as "one or embodiments." The term "another embodiment" is to be read as "at least one other embodiment." Other definitions, explicit and implicit, may be included below.

Figure 2:
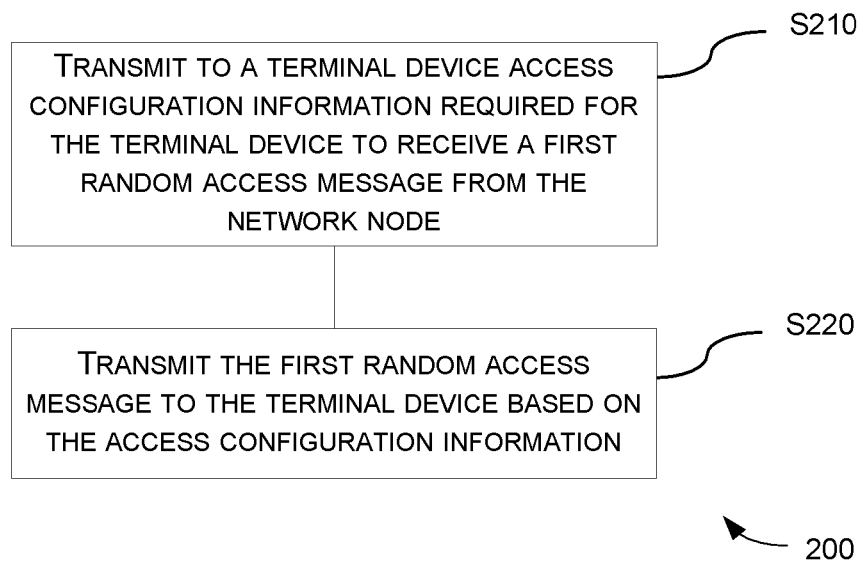
FIG. 2 is a flowchart illustrating a method for facilitating random access by a terminal device according to an embodiment of the present disclosure.

FIG. 2 is a flowchart illustrating a method 200 for facilitating random access by a terminal device according to an embodiment of the present disclosure. The method 200 can be performed in a network node, e.g., an eNB. The method 200 includes the following blocks At block S210, access configuration information required for the terminal device to receive a first random access message from the network node is transmitted to the terminal device.

Here, the first random access message can be for example, but not limited to, MSG2 shown in FIG. 1.

In an example, the access configuration information may indicate configurations for Resource Elements (REs), Demodulation Reference Signal (DMRS), payload size, Modulation and Coding Scheme (MCS) and receiving timing associated with the first random access message.

For each of the REs, DMRS, payload size, MCS and receiving timing, the access configuration information may indicate one single configuration.

In this case, the access configuration information may indicate a set of REs for carrying the first random access message, a DMRS for decoding the first random access message, a payload size of the first random access message, an MCS used for the first random access message, and a receiving timing to receive the first random access message.

Alternatively, for each of the REs, DMRS, payload size, MCS and receiving timing, the access configuration information may indicate a set of candidate configurations and a rule of mapping between the candidate configurations and transmission parameters associated with a second random access message transmitted from the terminal device to the network node before the first random access message is transmitted from the network node to the terminal device. Here, the second random access message can be for example, but not limited to, MSG1 shown in FIG. 1.

In this case, the access configuration information may indicate more than one candidate set of REs for carrying the first random access message, as well as a rule of mapping between the candidate RE sets and preamble sequences used for the second random access message. For example, assuming that there are 64 preamble sequences, P0, P1, . . . , P63, that can be used for the second random access message and the access configuration information indicates four RE sets, S0, S1, S2 and S3, the rule of mapping may require that the preamble sequences P0~P15 are mapped to S0; P16~P31 are mapped to S1; P32~P47 are mapped to S2; and P48~P63 are mapped to S3. In this way, the access configuration information allows the terminal device to determine the set of REs carrying the first random access message based on the preamble sequence the terminal device used for the second random access message.

Similarly, the access configuration information may indicate more than one candidate DMRS for decoding the first random access message, more than one candidate payload size of the first random access message, and/or more than one candidate MCS used for the first random access message, as well as a rule of mapping between the candidate DMRSs, candidate payload sizes, and/or candidate MCSs and preamble sequences used for the second random access message.

Further, the access configuration information may indicate more than one candidate receiving timing to receive the first random access message, as well as a rule of mapping between the candidate receiving timings and transmitting timings of the second random access message. For example, assuming that the second random access message is transmitted at time $t_1$, the rule of mapping may require a constant time offset $t_{off}$ between the receiving timing to receive the first random access message, denoted as $t_2$, and the transmitting timing of the second random access message. Accordingly, the access configuration information allows the terminal device to calculate $t_2=t_1+t_{off}$.

Optionally, when orthogonal scrambling sequences are used for distinguishing one terminal device from another, the access configuration information may further indicate a configuration for a scrambling sequence associated with the first random access message. Here, for the scrambling sequence, the access configuration information may indicate one single configuration, or a set of candidate configurations and a rule of mapping between the candidate configurations and transmission parameters associated with a second random access message transmitted from the terminal device to the network node prior to the first random access message. For example, the access configuration information may indicate more than one candidate scrambling sequence for scrambling the first random access message, as well as a rule of mapping between the candidate scrambling sequences and preamble sequences used for the second random access message.

In an example, the access configuration information can be included in a Common Access Information Table (C-AIT). Further, an update to at least a part of the access configuration information can be included in a Dedicated Access Information Table (D-AIT) for transmitting to the terminal device. The C-AIT is transmitted over a broadcast channel, referred to as Physical Anchor Channel (PACH), and contains fundamental system information required for a UE to access the network initially when it is powered on. Once the UE has attached to the network, it can acquire updated and/or further system information via a D-AIT. After that, the UE can use the system information defined in the D-AIT to access the network when it transitions from an idle/dormant mode to a connected mode.

At block S220, the first random access message is transmitted to the terminal device based on the access configuration information.

In an example, the method 200 may further include the following blocks (not shown), e.g., when the method is applied in a contention-based random access.

Further access configuration information required for the terminal device to receive a third random access message from the network node can be transmitted to the terminal device. Here, the third random access message can be for example, but not limited to, MSG4 shown in FIG. 1.

A control channel can be used for scheduling the third random access message. The further access configuration information may indicate configurations for REs, DMRS, payload size and MCS associated with the control channel.

Here, since the MSG2 has a very small size and is not UE specific, it is not necessary to define a control channel to schedule the MSG2. That is, the MSG2 can be independent of any control channel (e.g., PDCCH). In contrast, the MSG4 has a size that may vary quite a lot and is UE specific. It is thus beneficial to schedule MSG4 via a control channel.

Then, the third random access message can be transmitted to the terminal device.

In an example, the further access configuration information can be included in a C-AIT. Alternatively, the further access configuration information can be included in the first random access message. Further, an update to at least a part of the further access configuration information can be included in a D-AIT for transmitting to the terminal device.

Figure 3:
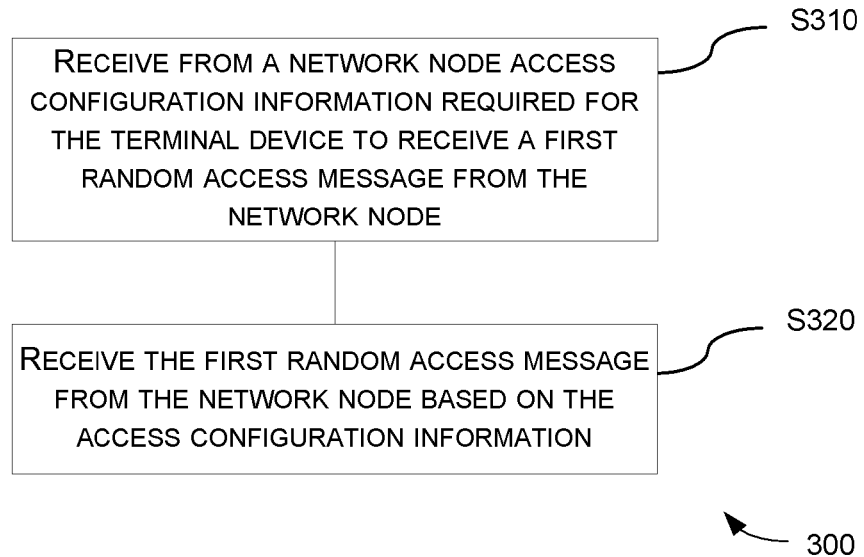
FIG. 3 is a flowchart illustrating a method for facilitating random access according to an embodiment of the present disclosure.

FIG. 3 is a flowchart illustrating a method 300 for facilitating random access according to an embodiment of the present disclosure. The method 300 can be performed in a terminal device, e.g., a UE. The method 300 includes the following steps.

At block S310, access configuration information required for the terminal device to receive a first random access message from a network node is received from the network node. Here, the first random access message can be for example, but not limited to, MSG2 shown in FIG. 1.

At block S320, the first random access message is received from the network node based on the access configuration information.

As described above in connection with the method 200, the access configuration information can indicate configurations for Resource Elements (REs), Demodulation Reference Signal (DMRS), payload size, Modulation and Coding Scheme (MCS) and receiving timing associated with the first random access message. For each of the REs, DMRS, payload size, MCS and receiving timing, the access configuration information may indicate one single configuration, or a set of candidate configurations and a rule of mapping between the candidate configurations and transmission parameters associated with a second random access message transmitted from the terminal device to the network node prior to the first random access message. Here, the second random access message can be for example, but not limited to, MSG1 shown in FIG. 1.

In the block S320, the configuration for each of the REs, DMRS, payload size, MCS and receiving timing can be determined based on: the single configuration, or the set of candidate configurations and the rule of mapping. The first random access message can then be received based on the determined configuration for each of the REs, DMRS, payload size, MCS and receiving timing.

Optionally, when orthogonal scrambling sequences are used for distinguishing one terminal device from another, the access configuration information may further indicate a configuration for a scrambling sequence associated with the first random access message. For the scrambling sequence, the access configuration information may indicate: one single configuration, or a set of candidate configurations and a rule of mapping between the candidate configurations and transmission parameters associated with a second random access message transmitted from the terminal device to the network node prior to the first random access message. In this case, in the block S320, the configuration for the scrambling sequence can be determined based on: the single configuration, or the set of candidate configurations and the rule of mapping. Then, the first random access message can be received based on the determined configuration for the scrambling sequence.

For details regarding how to determine the configuration for each of the REs, DMRS, payload size, MCS, receiving timing and scrambling sequence, reference can be made to the method 200 as described above and the description thereof will thus be omitted here.

In an example, the access configuration information can be included in a C-AIT. Further, an update to at least a part of the access configuration information can be received from the network node. The update can be included in a D-AIT.

In an example, the method 300 may further include the following blocks (not shown), e.g., when the method is applied in a contention-based random access.

Further access configuration information required for the terminal device to receive a third random access message from the network node can be received from the network node. Here, the third random access message can be for example, but not limited to, MSG4 shown in FIG. 1.

A control channel can be used for scheduling the third random access message. The further access configuration information may indicate configurations for REs, DMRS, payload size and MCS associated with the control channel.

Then, the third random access message from the network node can be received based on the further access configuration information.

In an example, the further access configuration information can be included in a C-AIT. Alternatively, the further access configuration information can be included in the first random access message. Further, an update to at least a part of the further access configuration information can be received from the network node. The update can be included in a D-AIT.

Figure 4:
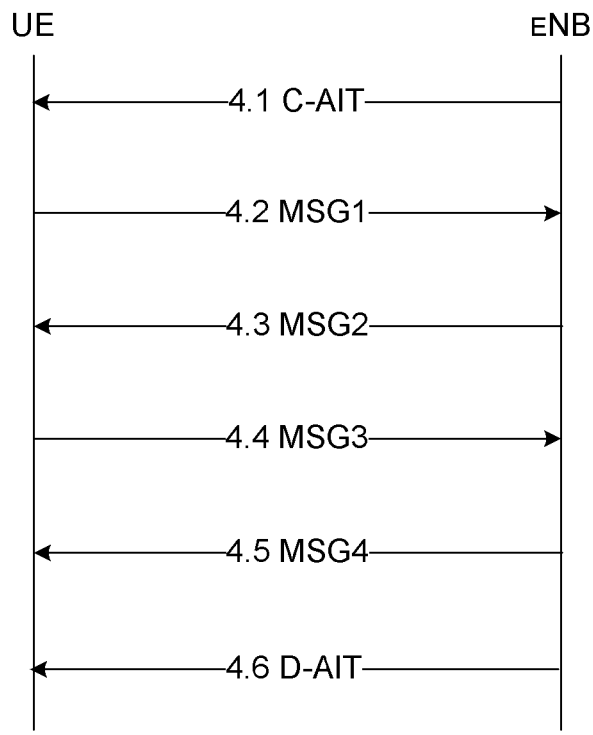
FIG. 4 is a schematic diagram showing a signaling sequence for explaining the methods shown in FIG. 2 and FIG. 3.

FIG. 4 shows a signaling sequence for explaining the methods 200 and 300 as described above. A contention-based random access procedure is shown in FIG. 4 as an example. It is also applicable to a contention-free random access procedure, except that no operations for MSG3 and MSG4 are required.

At 4.1, an eNB sends a C-AIT to a UE, e.g., when the UE is initially powered on. The C-AIT contains access configuration information associated with MSG2 (referred to as "MSG2 configuration" hereinafter), and optionally access configuration information associated with a control channel for scheduling MSG4 (referred to as "MSG4 configuration" hereinafter). At 4.2, the UE sends a MSG1 to the eNB. At 4.3, the eNB sends a MSG2 to the UE. Here, the MSG2 can be received by the UE based on the MSG2 configuration contained in the C-AIT. The MSG4 configuration may alternatively be contained in the MSG2.

At 4.4, the UE sends a MSG3 to the eNB. At 4.5, the eNB sends a MSG4 to the UE. Here, the MSG4 can be received by the UE based on the MSG4 configuration contained in the C-AIT or the MSG2.

At 4.6, the eNB sends a D-AIT to the UE. The D-AIT may contain an update to the MSG2 configuration and/or an update to the MSG4 configuration, such that the UE can use the updated MSG2 configuration and/or MSG4 configuration in the subsequent random access procedure, e.g., when it transitions from an idle/dormant mode to a connected mode.

Figure 5:
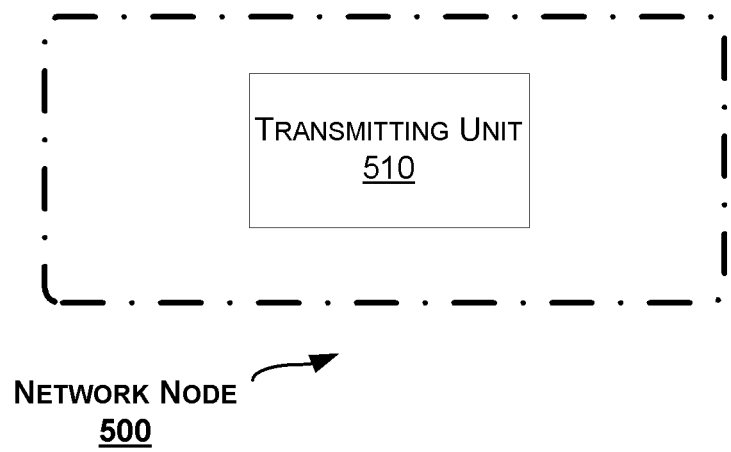
FIG. 5 is a block diagram of a network node according to an embodiment of the present disclosure.

Correspondingly to the method 200 as described above, a network device is provided. FIG. 5 is a block diagram of a network node 500 for facilitating random access by a terminal device according to an embodiment of the present disclosure. The network node 500 can be e.g., an eNB.

As shown in FIG. 5, the network node 500 includes a transmitting unit 510 configured to transmit to the terminal device access configuration information required for the terminal device to receive a first random access message from the network node. The transmitting unit 510 is further configured to transmit the first random access message to the terminal device based on the access configuration information.

In an embodiment, the access configuration information indicates configurations for Resource Elements (REs), Demodulation Reference Signal (DMRS), payload size, Modulation and Coding Scheme (MCS) and receiving timing associated with the first random access message.

In an embodiment, for each of the REs, DMRS, payload size, MCS and receiving timing, the access configuration information indicates: one single configuration, or a set of candidate configurations, and a rule of mapping between the candidate configurations and transmission parameters associated with a second random access message transmitted from the terminal device to the network node prior to the first random access message.

In an embodiment, the access configuration information further indicates a configuration for a scrambling sequence associated with the first random access message.

In an embodiment, for the scrambling sequence, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the access configuration information is included in a Common Access Information Table (C-AIT).

In an embodiment, the transmitting unit 510 is further configured to: transmit to the terminal device an update to at least a part of the access configuration information. The update is included in a Dedicated Access Information Table (D-AIT).

In an embodiment, the transmitting unit 510 is further configured to: transmit to the terminal device further access configuration information required for the terminal device to receive a third random access message from the network node; and transmit the third random access message to the terminal device.

In an embodiment, the further access configuration information indicates configurations for REs, DMRS, payload size and MCS associated with a control channel for scheduling the third random access message.

In an embodiment, the further access configuration information is included in a Common Access Information Table (C-AIT) or in the first random access message.

In an embodiment, the transmitting unit 510 is further configured to: transmit to the terminal device an update to at least a part of the further access configuration information. The update is included in a Dedicated Access Information Table (D-AIT).

The unit 510 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
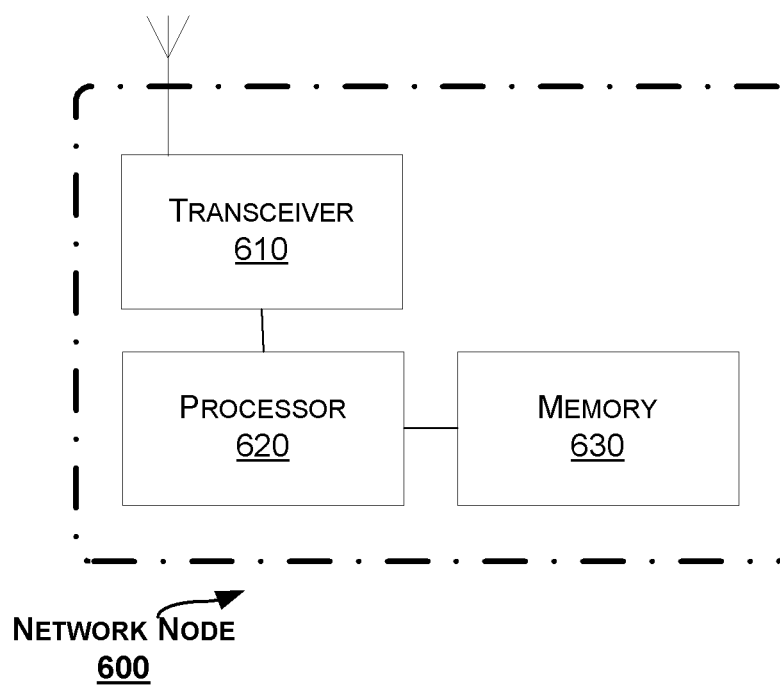
FIG. 6 is a block diagram of a terminal device according to an embodiment of the present disclosure.

FIG. 6 is a block diagram of a network node 600 according to another embodiment of the present disclosure.

The network node 600 can be provided for facilitating random access by a terminal device. The network node 600 includes a transceiver 610, a processor 620 and a memory 630. The memory 630 contains instructions executable by the processor 620 whereby the network node 600 is operative to: transmit to the terminal device access configuration information required for the terminal device to receive a first random access message from the network node; and transmit the first random access message to the terminal device based on the access configuration information.

Figure 7:
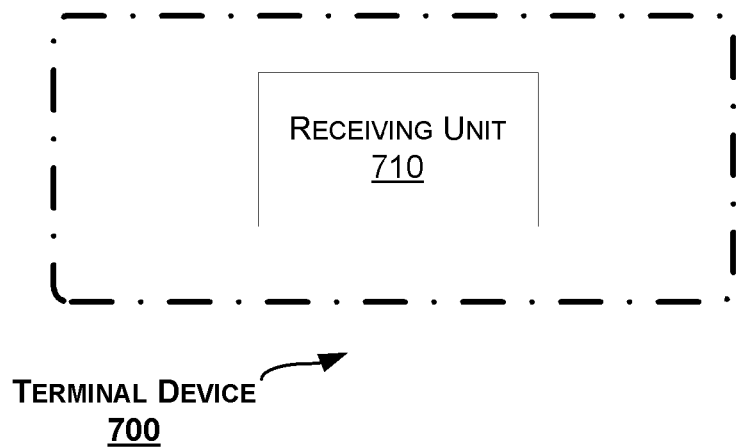
FIG. 7 is a block diagram of a network node according to another embodiment of the present disclosure.

Correspondingly to the method 300 as described above, a terminal device is provided. FIG. 7 is a block diagram of a terminal device 700 for facilitating random access according to an embodiment of the present disclosure. The terminal device 700 can be e.g., a UE.

As shown in FIG. 7, the terminal device 700 includes a receiving unit 710 configured to receive from a network node access configuration information required for the terminal device to receive a first random access message from the network node. The receiving unit 710 is further configured to receive the first random access message from the network node based on the access configuration information.

In an embodiment, the access configuration information indicates configurations for Resource Elements (REs), Demodulation Reference Signal (DMRS), payload size, Modulation and Coding Scheme (MCS) and receiving timing associated with the first random access message.

In an embodiment, for each of the REs, DMRS, payload size, MCS and receiving timing, the access configuration information indicates: one single configuration, or a set of candidate configurations, and a rule of mapping between the candidate configurations and transmission parameters associated with a second random access message transmitted from the terminal device to the network node prior to the first random access message.

In an embodiment, the receiving unit 710 is configured to receive the first random access message from the network node based on the access configuration information by: determining the configuration for each of the REs, DMRS, payload size, MCS and receiving timing based on: the single configuration, or the set of candidate configurations and the rule of mapping; and receiving the first random access message based on the determined configuration for each of the REs, DMRS, payload size, MCS and receiving timing.

In an embodiment, the access configuration information further indicates a configuration for a scrambling sequence associated with the first random access message.

In an embodiment, for the scrambling sequence, the access configuration information indicates: one single configuration, or a set of candidate configurations and a rule of mapping between the candidate configurations and transmission parameters associated with a second random access message transmitted from the terminal device to the network node prior to the first random access message.

In an embodiment, the receiving unit 710 is configured to receive the first random access message from the network node based on the access configuration information by: determining the configuration for the scrambling sequence based on: the single configuration, or the set of candidate configurations and the rule of mapping; and receiving the first random access message based on the determined configuration for the scrambling sequence.

In an embodiment, the access configuration information is included in a Common Access Information Table (C-AIT).

In an embodiment, the receiving unit 710 is further configured to: receive from the network node an update to at least a part of the access configuration information. The update is included in a Dedicated Access Information Table (D-AIT).

In an embodiment, the receiving unit 710 is further configured to: receive from the network node further access configuration information required for the terminal device to receive a third random access message from the network node; and receive the third random access message from the network node based on the further access configuration information.

In an embodiment, the further access configuration information indicates configurations for REs, DMRS, payload size and MCS associated with a control channel for scheduling the third random access message.

In an embodiment, the further access configuration information is included in a Common Access Information Table (C-AIT) or in the first random access message.

In an embodiment, the receiving unit 710 is further configured to: receive from the network node an update to at least a part of the further access configuration information. The update is included in a Dedicated Access Information Table (D-AIT).

The unit 710 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 8:
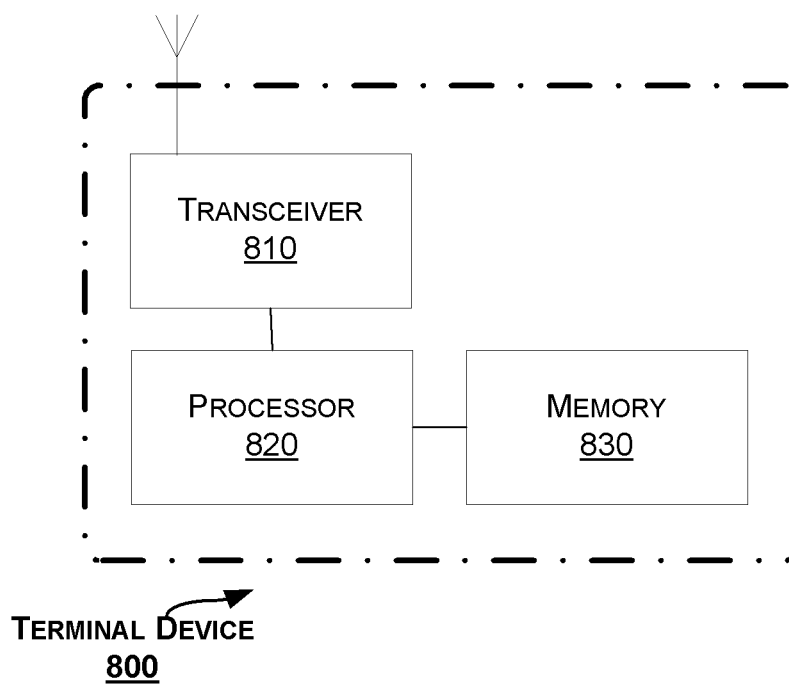
FIG. 8 is a block diagram of a terminal device according to another embodiment of the present disclosure.

FIG. 8 is a block diagram of a terminal device 800 according to another embodiment of the present disclosure.

The terminal device 800 can be provided for facilitating random access. The terminal device 800 includes a transceiver 810, a processor 820 and a memory 830. The memory 830 contains instructions executable by the processor 820 whereby the terminal device 800 is operative to: receive from a network node access configuration information required for the terminal device to receive a first random access message from the network node; and receive the first random access message from the network node based on the access configuration information.

The present disclosure also provides one or more computer program products in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 620 causes the network device 600 to perform the actions, e.g., of the procedure described earlier in conjunction with FIG. 2; or code/computer readable instructions, which when executed by the processor 820 causes the terminal device 800 to perform the actions, e.g., of the procedure described earlier in conjunction with FIG. 3.

The computer program product may be configured as a computer program code structured in computer program modules. The computer program modules could essentially perform the actions of the flow illustrated in FIG. 2 or 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device, comprising:
receiving from a network node access configuration information required for the terminal device to receive a first random access message from the network node, wherein the access configuration information is included in a Common Access Information Table (C-AIT) over a broadcast channel, wherein the C-AIT indicates:
a Demodulation Reference Signal (DMRS) for decoding the first random access message from the network node, and
a payload size of the first random access message from the network node;
receiving, without using a cell reference signal (CRS) from the network node, the first random access message from the network node based on the access configuration information; and
transmitting a second random access message from the terminal device to the network node based on the access configuration information including a plurality of candidate configurations and a rule of mapping between the candidate configurations and transmission parameters for the second random access message.

2. The method of claim 1, wherein the C-AIT further indicates configurations for Resource Elements (REs), a Modulation and Coding Scheme (MCS), and receiving timing associated with the first random access message.

3. The method of claim 2, wherein, for each of the REs, DMRS, payload size, MCS and receiving timing, the C-AIT indicates:
one single configuration, or
the plurality of candidate configurations and the rule of mapping.

4. The method of claim 3, wherein said receiving the first random access message from the network node based on the access configuration information comprises:
determining the configuration for each of the REs, DMRS, payload size, MCS and receiving timing based on: the single configuration, or the plurality of candidate configurations and the rule of mapping; and
receiving the first random access message based on the determined configuration for each of the REs, DMRS, payload size, MCS and receiving timing.

5. The method of claim 2, wherein the C-AIT further indicates a configuration for a scrambling sequence associated with the first random access message.

6. The method of claim 5, wherein, for the scrambling sequence, the C-AIT indicates:
one single configuration, or
the plurality of candidate configurations and the rule of mapping.

7. The method of claim 5, wherein said receiving the first random access message from the network node based on the access configuration information comprises:
determining the configuration for the scrambling sequence based on one single configuration, or the plurality of candidate configurations and the rule of mapping; and
receiving the first random access message based on the determined configuration for the scrambling sequence.

8. The method of claim 1, further comprising:
receiving from the network node an update to at least a part of the access configuration information,
wherein the update is included in a Dedicated Access Information Table (D-AIT).

9. The method of claim 1, further comprising:
receiving from the network node further access configuration information required for the terminal device to receive a third random access message from the network node; and
receiving the third random access message from the network node based on the further access configuration information.

10. The method of claim 9, wherein the further access configuration information indicates configurations for Resource Elements (REs), Demodulation Reference Signal (DMRS), payload size and Modulation and Coding Scheme (MCS) associated with a control channel for scheduling the third random access message.

11. The method of claim 9, wherein the further access configuration information is included in the Common Access Information Table (C-AIT) or in the first random access message.

12. The method of claim 9, further comprising:
receiving from the network node an update to at least a part of the further access configuration information,
wherein the update is included in a Dedicated Access Information Table (D-AIT).

13. A terminal device, comprising:
a transceiver, a processor, and a non-transitory computer readable storage medium comprising instructions executable by said processor to cause the terminal device to:
receive from a network node access configuration information required for the terminal device to receive a first random access message from the network node, wherein the access configuration information is included in a Common Access Information Table (C-AIT) over a broadcast channel, wherein the C-AIT indicates:
a Demodulation Reference Signal (DMRS) for decoding the first random access message, and
a payload size of the first random access message from the network node,
receive the first random access message from the network node based on the access configuration information, and
transmit a second random access message from the terminal device to the network node based on the access configuration information including a plurality of candidate configurations and a rule of mapping between the candidate configurations and transmission parameters for the second random access message.

14. The terminal device of claim 13, wherein the C-AIT further indicates configurations for Resource Elements (REs), a Modulation and Coding Scheme (MCS), and receiving timing associated with the first random access message.

15. The terminal device of claim 14, wherein, for each of the REs, DMRS, payload size, MCS and receiving timing, the C-AIT indicates:
one single configuration, or
the plurality of candidate configurations and the rule of mapping.

16. The terminal device of claim 15, wherein the reception of the first random access message from the network node is based on the access configuration information by:
determining the configuration for each of the Resource Elements (REs), Demodulation Reference Signal (DMRS), payload size, Modulation and Coding Scheme (MCS) and receiving timing based on: the single configuration, or the set of candidate configurations and the rule of mapping; and
receiving the first random access message based on the determined configuration for each of the REs, DMRS, payload size, MCS and receiving timing.

17. The terminal device of claim 14, wherein the C-AIT further indicates a configuration for a scrambling sequence associated with the first random access message.

18. The terminal device of claim 17, wherein, for the scrambling sequence, the C-AIT indicates:
one single configuration, or
the plurality of candidate configurations and the rule of mapping.

19. The terminal device of claim 17, wherein the reception of the first random access message from the network node is based on the access configuration information by:
determining the configuration for the scrambling sequence based on: one single configuration, or the plurality of candidate configurations and the rule of mapping; and
receiving the first random access message based on the determined configuration for the scrambling sequence.

20. The terminal device of claim 13, wherein the terminal device is further to:
receive from the network node an update to at least a part of the access configuration information,
wherein the update is included in a Dedicated Access Information Table (D-AIT).

21. The terminal device of claim 13, wherein the terminal device is further to:
receive from the network node further access configuration information required for the terminal device to receive a third random access message from the network node; and
receive the third random access message from the network node based on the further access configuration information.

22. The terminal device of claim 21, wherein the further access configuration information indicates configurations for Resource Elements (REs), Demodulation Reference Signal (DMRS), payload size and Modulation and Coding Scheme (MCS) associated with a control channel for scheduling the third random access message.

23. The terminal device of claim 21, wherein the further access configuration information is included in the Common Access Information Table (C-AIT) or in the first random access message.

24. The terminal device of claim 21, wherein the terminal device is further to:
receive from the network node an update to at least a part of the further access configuration information,
wherein the update is included in a Dedicated Access Information Table (D-AIT).

* * * * *